United States Patent [19]
Holban

[11] Patent Number: 5,754,098
[45] Date of Patent: May 19, 1998

[54] TAXI CAB EMERGENCY SIGNAL

[76] Inventor: Daniel Holban, 302 N. Hubert Ave., #222, Tampa, Fla. 33609

[21] Appl. No.: 818,441

[22] Filed: Mar. 17, 1997

[51] Int. Cl.⁶ .................................................. B60Q 1/00
[52] U.S. Cl. .......................................... 340/434; 340/472
[58] Field of Search .................................. 340/434, 472, 340/468, 471, 473

[56] References Cited

U.S. PATENT DOCUMENTS

| | | | |
|---|---|---|---|
| 2,814,028 | 11/1957 | Hamilton | 340/434 |
| 4,259,664 | 3/1981 | Boisclair | 340/434 |
| 4,550,304 | 10/1985 | Saitta | 340/434 |
| 4,841,277 | 6/1989 | Wilson | 340/434 |
| 4,882,570 | 11/1989 | Martinez | 340/434 |
| 5,132,666 | 7/1992 | Fahs | 340/472 |

FOREIGN PATENT DOCUMENTS 2457525  1/1981  France ................................ 340/434

*Primary Examiner*—Brent A. Swarthout

[57] ABSTRACT

A taxi cab emergency signal including an emergency light situated on a roof of a taxi cab. The emergency light adapted to create a visual signal upon the receipt of power. Further included is an emergency switch discretely situated within the taxi cab adjacent a driver thereof and electrically connected between a power source and the emergency light for allowing the supply of power thereto upon the actuation thereof.

1 Claim, 3 Drawing Sheets

5,754,098

TAXI CAB EMERGENCY SIGNAL

BACKGROUND OF THE INVENTION

1. Field of the Invention

The present invention relates to a taxi cab emergency signal and more particularly pertains to allowing a taxi cab driver to signal an emergency situation.

2. Description of the Prior Art

The use of lights situated on the roof of taxi cabs is known in the prior art. More specifically, lights situated on the roof of taxi cabs heretofore devised and utilized for the purpose of signalling and advertising purposes are known to consist basically of familiar, expected and obvious structural configurations, notwithstanding the myriad of designs encompassed by the crowded prior art which have been developed for the fulfillment of countless objectives and requirements.

By way of example, the prior art includes U.S. Pat. Nos. 4,550,304 to Saitta; 5,156,274 to Williams, Jr.; U.S. Pat. No. Des. 245,940 to George; U.S. Pat. Nos. 4,882,570 to Martinez; 4,259,664 to Boisclair; and 4,841,277 to Wilson.

In this respect, the taxi cab emergency signal according to the present invention substantially departs from the conventional concepts and designs of the prior art, and in so doing provides an apparatus primarily developed for the purpose of allowing a taxi cab driver to indicate an emergency situation.

Therefore, it can be appreciated that there exists a continuing need for a new and improved taxi cab emergency signal which can be used for allowing a taxi cab driver to indicate an emergency situation. In this regard, the present invention substantially fulfills this need.

SUMMARY OF THE INVENTION

In view of the foregoing disadvantages inherent in the known types of lights situated on the roof of taxi cabs now present in the prior art, the present invention provides an improved taxi cab emergency signal. As such, the general purpose of the present invention, which will be described subsequently in greater detail, is to provide a new and improved taxi cab emergency signal which has all the advantages of the prior art and none of the disadvantages.

To attain this, the present invention essentially comprises a mounting platform. Such platform includes a horizontally oriented rectangular plate with a top face and a bottom face. The bottom face is coupled to a roof of an unillustrated taxi cab. Further provided is a translucent exterior housing having a generally rectangular configuration with a front face, a rear face, and a periphery formed therebetween defining an interior space and an bottom opening. The exterior housing has non-emergency opaque indicia formed on the front face and rear face thereof. The bottom opening of the exterior housing is coupled to the top face of the plate of the mounting platform. It should be noted that a periphery of the bottom opening is positioned coincidentally with a periphery of the plate of the mounting platform. As best shown in FIG. 3, an opaque interior housing is included. The interior housing has a rectangular configuration with a front face, a rear face, and a periphery formed therebetween defining an interior space. The interior housing is coupled to the top face of the plate of the mounting platform within the exterior housing. A translucent window is formed in the front face and rear face of the interior housing. Such translucent window takes the form of an emergency indicia. With reference still to FIG. 3, a first non-emergency light is included which is adapted to emit normal white light upon the receipt of power. The first light is situated exteriorly on a top face of the interior housing and further within the exterior housing for emitting the white light through the exterior housing. Situated within the interior housing is a second emergency light which is adapted to intermittently emit red light upon the receipt of power. The second light is adapted for emitting the red light through the windows of the interior housing and further through the exterior housing. With reference to FIG. 5, a first non-emergency switch is situated on a dash of the taxi cab and electrically connected between a power source and the first non-emergency light. By this design, the first non-emergency switch is adapted for allowing the supply of power thereto upon the actuation thereof. Associated therewith is a second emergency switch situated on a floorboard of the taxi cab adjacent a driver thereof. The second emergency switch is electrically connected between a power source and the second emergency light for allowing the supply of power thereto upon the actuation thereof.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved taxi cab emergency signal which has all the advantages of the prior art lights situated on the roof of taxi cabs and none of the disadvantages.

It is another object of the present invention to provide a new and improved taxi cab emergency signal which may be easily and efficiently manufactured and marketed.

It is a further object of the present invention to provide a new and improved taxi cab emergency signal which is of a durable and reliable construction.

An even further object of the present invention is to provide a new and improved taxi cab emergency signal which is susceptible of a low cost of manufacture with regard to both materials and labor, and which accordingly is then susceptible of low prices of sale to the consuming public, thereby making such taxi cab emergency signal economically available to the buying public.

Still yet another object of the present invention is to provide a new and improved taxi cab emergency signal which provides in the apparatuses and methods of the prior art some of the advantages thereof, while simultaneously overcoming some of the disadvantages normally associated therewith.

Still another object of the present invention is to allow a taxi cab driver to indicate an emergency situation.

Lastly, it is an object of the present invention to provide a new and improved taxi cab emergency signal including an emergency light situated on a roof of a taxi cab. The emergency light adapted to create a visual signal upon the receipt of power. Further included is an emergency switch discretely situated within the taxi cab adjacent a driver thereof and electrically connected between a power source and the emergency light for allowing the supply of power thereto upon the actuation thereof.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

Similar reference characters refer to similar parts throughout the several views of the drawings.

DESCRIPTION OF THE PREFERRED EMBODIMENT

Figure 1:
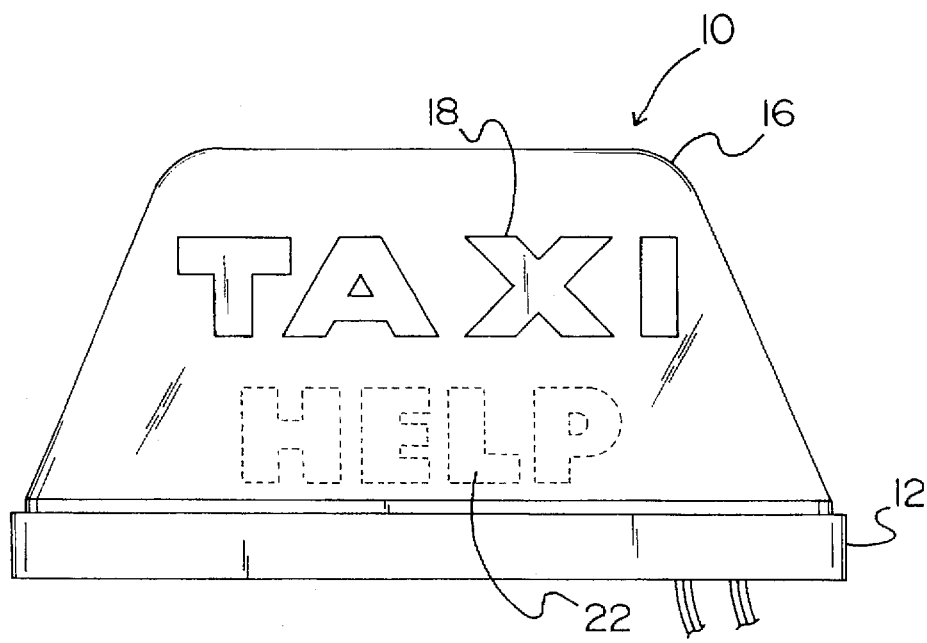
FIG. 1 is a perspective illustration of the preferred embodiment of the taxi cab emergency signal constructed in accordance with the principles of the present invention.
Figure 2:
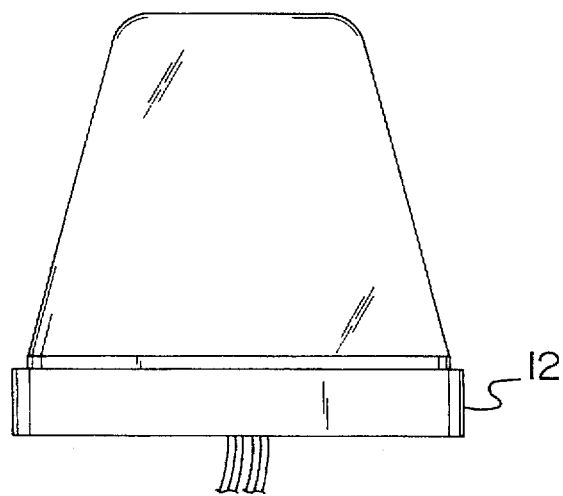
FIG. 2 is a side view of the exterior housing and associated mounting platform.

With reference now to the drawings, and in particular to FIG. 1 thereof, a new and improved taxi cab emergency signal embodying the principles and concepts of the present invention and generally designated by the reference numeral 10 will be described.

The present invention, the new and improved taxi cab emergency signal, is comprised of a plurality of components. Such components in their broadest context include a mounting platform, exterior housing, interior housing, non-emergency light, emergency light, non-emergency switch, and an emergency switch. Such components are individually configured and correlated with respect to each other so as to attain the desired objective.

More specifically, it will be noted that the system 10 of the present invention includes a mounting platform 12. Such platform includes a horizontally oriented rectangular plate 14 with a top face and a bottom face. The bottom face is coupled to a roof of an unillustrated taxi cab. Such coupling is preferably accomplished via an adhesive or mounting screws.

Further provided is a translucent exterior housing 16 having a generally rectangular configuration with a front face, a rear face, and a periphery formed therebetween defining an interior space and an bottom opening. Ideally, the exterior housing has a slightly arcuate edges and is constructed from a tinted plastic. The exterior housing has non-emergency opaque indicia 18 formed on the front face and rear face thereof. Such indicia preferably comprising the word "TAXI". The bottom opening of the exterior housing is coupled to the top face of the plate of the mounting platform. It should be noted that a periphery of the bottom opening is positioned coincidentally with a periphery of the plate of the mounting platform.

Figure 3:
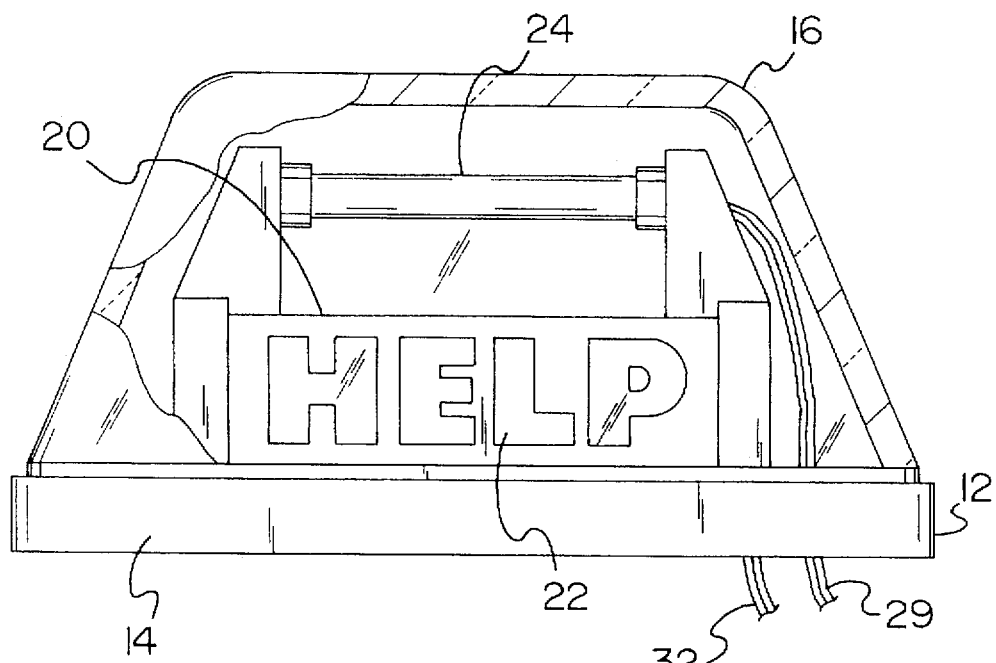
FIG. 3 is a cut-away view of the exterior housing.

As best shown in FIG. 3, an opaque interior housing 20 is included. The interior housing has a rectangular configuration with a front face, a rear face, and a periphery formed therebetween defining an interior space. The interior housing is coupled to the top face of the plate of the mounting platform within the exterior housing. A translucent window 22 is formed in the front face and rear face of the interior housing. Such translucent window takes the form of an emergency indicia. The emergency indicia preferably comprises the word "HELP". Ideally, the windows of the interior housing are positioned proximal to the exterior housing for reasons that will become apparent later.

With reference still to FIG. 3, a first non-emergency light 24 is included which is adapted to emit normal white light upon the receipt of power. The first light is situated exteriorly on a top face of the interior housing and further within the exterior housing for emitting the white light through the exterior housing. Ideally, the first non-emergency light is fixed to the interior housing via a pair of stanchions which extend upwardly to maintain the first light at a position midway between a top of the exterior housing and a top of the interior housing. Such first non-emergency light preferably comprises a standard florescent light.

Situated within the interior housing is a second emergency light 26 which is adapted to intermittently emit red light upon the receipt of power. An unillustrated RC network or multivibrator may be utilized to accomplish such intermittent actuation. The second light is adapted for emitting the red light through the windows of the interior housing and further through the exterior housing. To ensure that the emergency indicia is legible, the interior housing allows the emission of light solely through the windows thereof.

Figure 5:
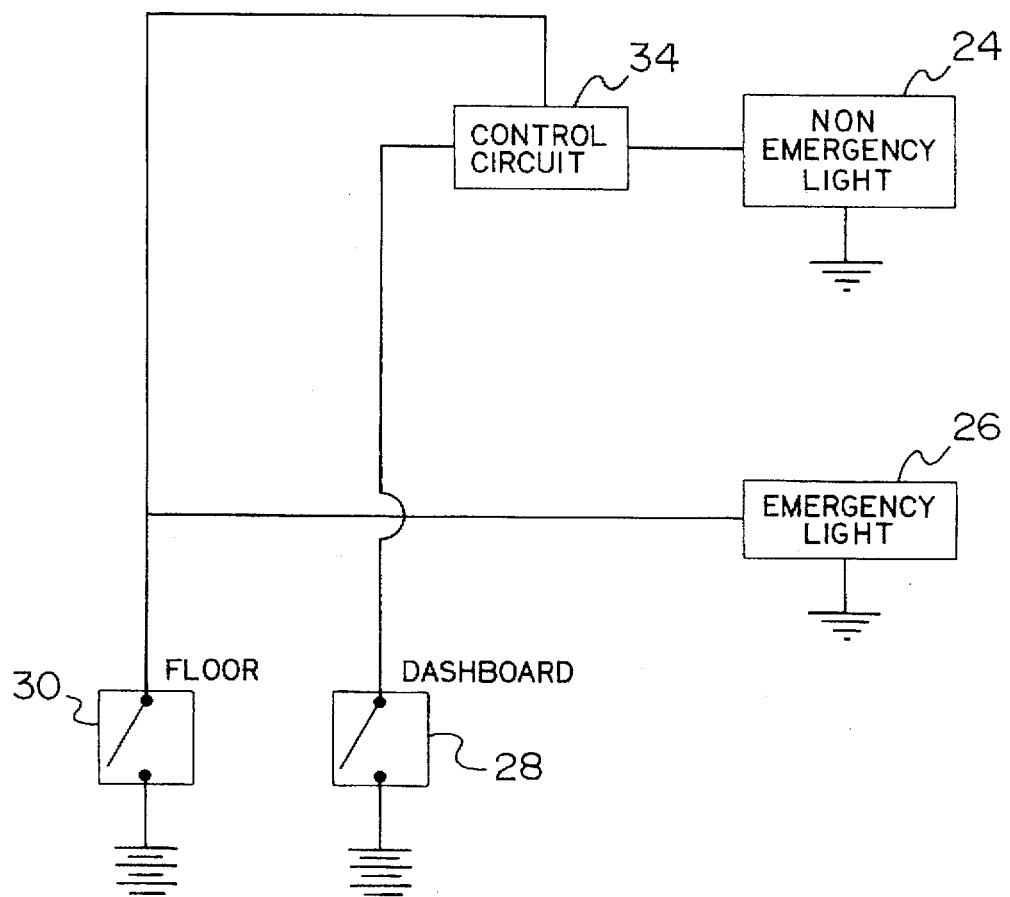
FIG. 5 is a schematic diagram depicting the electrical components of the present invention.

With reference to FIG. 5, a first non-emergency switch 28 is situated on a dash of the taxi cab and electrically connected between a power source and the first non-emergency light via a wire 29. By this design, the first non-emergency switch is adapted for allowing the supply of power to the first non-emergency light upon the actuation thereof.

Figure 4:
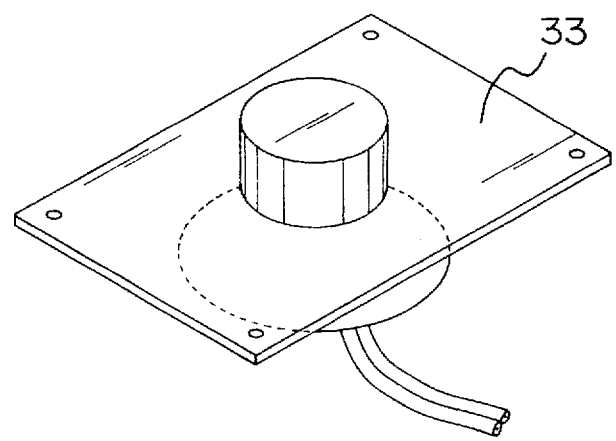
FIG. 4 is a perspective illustration of the mechanical aspects of the switches utilized in the present invention.

Associated therewith is a second emergency switch 30 situated on a floorboard of the taxi cab adjacent a driver thereof. The second emergency switch is electrically connected between a power source and the second emergency light via a wire 32 for allowing the supply of power to the second emergency light upon the actuation thereof. As shown in FIG. 4, the switches comprise of a push button which is adapted to be maintained in an actuated orientation upon the depression thereof. The switches may be deactivated by subsequently depressing the push button a second time. Also such switches are fitted on a plate 33 with a plurality of apertures for allowing them to be conveniently retrofitted.

As an option, control circuitry 34 may be electrically connected between the non-emergency switch and the non-emergency light. The control circuitry is further connected to the emergency switch for feedback purposes. In use, a user may actuate the non-emergency switch to supply power to the non-emergency light thereby indicating that the taxi is in service. If the driver is threatened or is in an emergency situation, the emergency switch may be actuated thereby signaling for help via the emergency light. It should be noted that the control circuitry is adapted to preclude power from being supplied to the non-emergency light upon the actuation of the emergency switch. This is to ensure that the non-emergency light does not interfere with the emergency light. As such, the control circuitry ensures that the non-emergency light is not supplied power when the emergency switch is actuated.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved taxi cab emergency signal comprising, in combination:

a mounting platform including a horizontally oriented rectangular plate with a top face and a bottom face, the bottom face coupled to a roof of a taxi cab via a plurality of mounting screws;

a translucent exterior housing constructed from tinted plastic having a generally rectangular configuration with a front face, a rear face, and a periphery formed therebetween defining an interior space and an bottom opening, the exterior housing having non-emergency opaque indicia comprising the word "TAXI" formed on the front face and rear face thereof, whereby the bottom opening of the exterior housing is coupled to the top face of the plate of the mounting platform wherein a periphery of the bottom opening is positioned coincidentally with a periphery of the plate of the mounting platform;

an opaque interior housing having a rectangular configuration with a front face, a rear face, and a periphery formed therebetween defining an interior space, the interior housing coupled to the top face of the plate of the mounting platform within the exterior housing, the interior housing further having a translucent window formed in the front face and rear face thereof, the translucent window being formed of an emergency indicia comprising the word "HELP";

a first non-emergency fluorescent light adapted to emit normal white light upon the receipt of power, the first light situated exteriorly on a top face of the interior housing and further within the exterior housing for emitting the white light through the exterior housing, the first non-emergency light fixed to the interior housing via a pair of stanchions which extend upwardly to maintain a position of the first non-emergency light midway between a top of the exterior housing and a top of the interior housing;

a second emergency light adapted to intermittently emit red light upon the receipt of power, the second light positioned within the interior housing for emitting the red light through the window of the interior housing and further through the exterior housing;

a first non-emergency push button switch situated on a dash of the taxi cab and electrically connected between a power source and the first non-emergency light for allowing the supply of power thereto upon the actuation thereof, the first non-emergency push button switch fitted on a plate with a plurality of apertures for mounting purposes, whereby the first non-emergency push button switch is adapted to be maintained in an actuated orientation upon the depression thereof and further deactivated upon a second depression thereof;

a second emergency push button switch situated on a floorboard of the taxi cab adjacent a driver thereof and electrically connected between a power source and the second emergency light for allowing the supply of power thereto upon the actuation thereof, the second emergency push button switch fitted on a plate with a plurality of apertures for mounting purposes, whereby the second emergency push button switch is adapted to be maintained in an actuated orientation upon the depression thereof and further deactivated upon a second depression thereof; and control circuitry electrically connected between the non-emergency switch, the non-emergency light, and the emergency switch, the control circuitry precluding power from being supplied to the non-emergency light upon the actuation of the emergency switch to ensure that the non-emergency light does not interfere with the emergency light.

\* \* \* \* \*